March 18, 1958 C. G. MENARD 2,826,876
MACHINE TOOL
Filed Nov. 14, 1956 4 Sheets-Sheet 1

INVENTOR.
Clifford G. Menard
BY
Norman S. Blodgett
Attorney

March 18, 1958

C. G. MENARD 2,826,876

MACHINE TOOL

Filed Nov. 14, 1956

4 Sheets-Sheet 2

INVENTOR.
Clifford G. Menard
BY
Norman S. Blodgett
Attorney

March 18, 1958

C. G. MENARD 2,826,876

MACHINE TOOL

Filed Nov. 14, 1956

4 Sheets-Sheet 3

INVENTOR.
Clifford G. Menard
BY Norman S. Blodgett
Attorney

March 18, 1958   C. G. MENARD   2,826,876
MACHINE TOOL

Filed Nov. 14, 1956   4 Sheets-Sheet 4

INVENTOR.
Clifford G. Menard
BY
Norman S. Blodgett
Attorney

United States Patent Office 2,826,876
Patented Mar. 18, 1958

2,826,876

MACHINE TOOL

Clifford G. Menard, Shrewsbury, Mass., assignor to The Heald Machine Company, Worcester, Mass., a corporation of Delaware Application November 14, 1956, Serial No. 622,177

7 Claims. (Cl. 51—165)

This invention relates to a machine tool and more particularly to apparatus for assuring smooth relative movement of two elements of a machine.

In the machine tool industry one of the outstanding problems confronting those working in the art is that of providing a smooth advancement of the tool into the work. This is particularly true in the case of finish grinding of work surfaces. Uneven feeding of the tool laterally of a right cylindrical surface, for instance, produces erratic removal of material so that the cross-section may not be perfectly circular and the diameter may vary also in the axial direction. These and other deficiencies of the prior art machines have been obviated in a novel manner by the present invention.

It is therefore an outstanding object of the invention to provide a machine tool having smooth, even relative travel between two elements.

Another object of this invention is the provision of a machine tool in which feeding action between the tool and the surface of the work is accomplished at a constant speed.

It is a further object of the instant invention to provide a machine tool having friction-free feed with substantially viscous damping.

Figure 1:
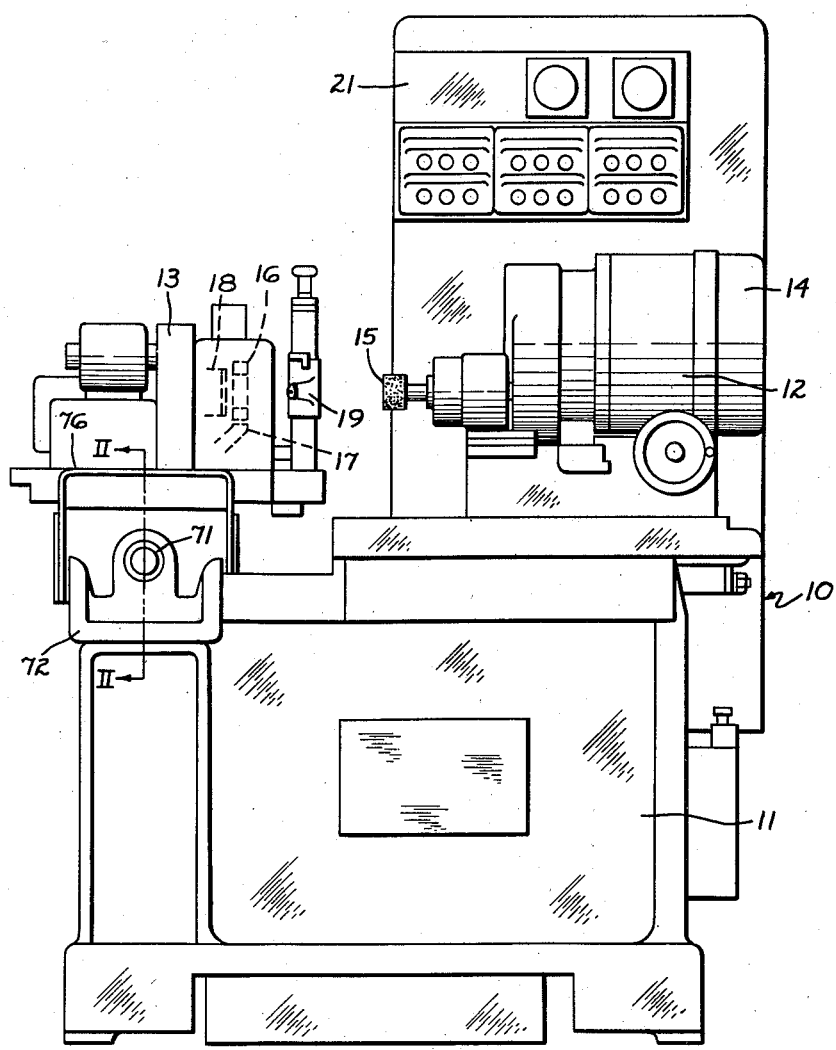
Figure 2:
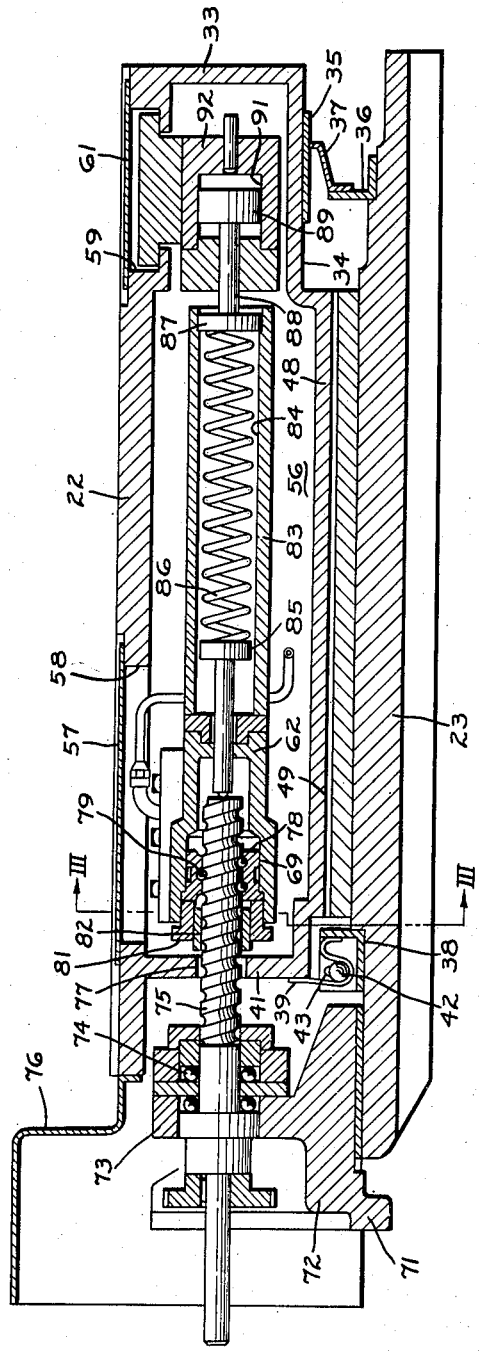
Figure 3:
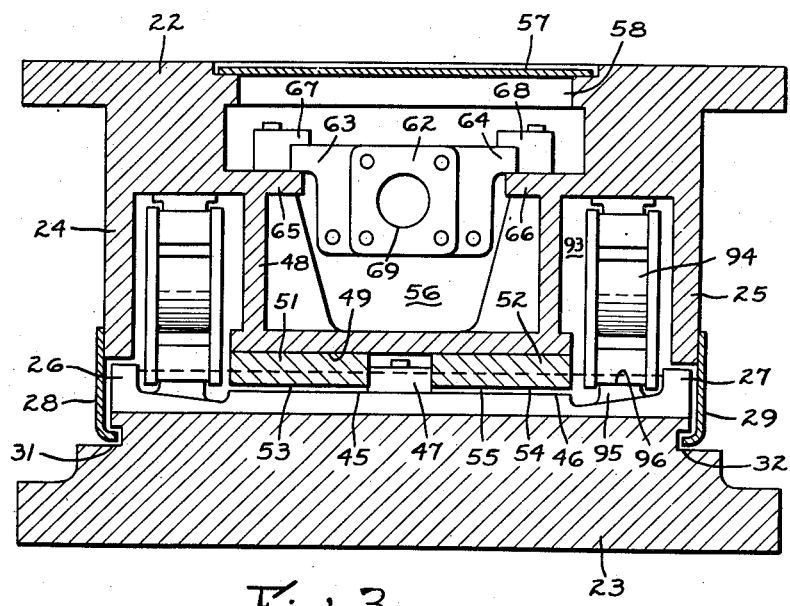
Figure 5:
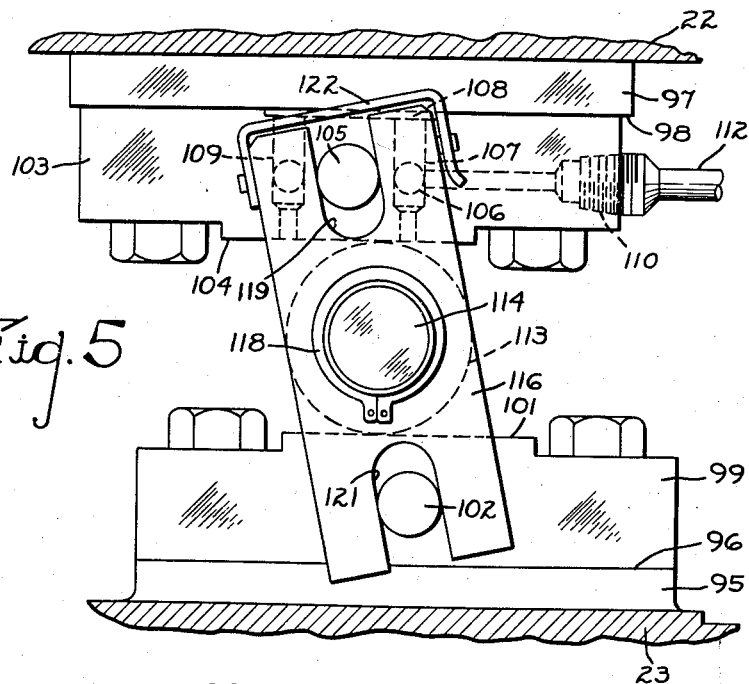
Figure 4:
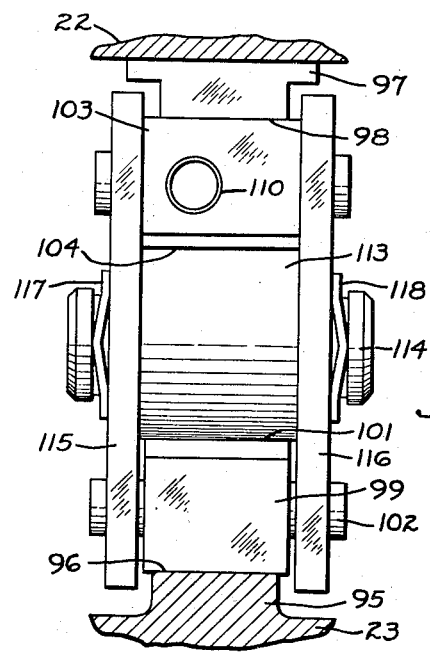

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which:

Figure 1 is a front elevational view of a machine tool embodying the principles of the invention, Figure 2 is a sectional view of a portion of the machine tool taken on the line II—II of Figure 1, Figure 3 is a sectional view taken on the line III—III of Figure 2, Figure 4 is an enlarged view of a portion of the construction shown in Figure 3, and Figure 5 is a side view of the apparatus shown in Figure 4.

Referring first to Figure 1, wherein are best shown the general features of the invention, a machine tool, indicated generally by the reference numeral 10, is shown as an internal grinding machine. As is usual in such machines, a base 11 is provided on which are mounted a wheelhead 12 and a workhead 13. The wheelhead has a drive motor 14 connected to drive an abrading wheel 15 and is mounted for movement relative to the base 11 in the direction of the axis of the wheel. The workhead 13 is mounted for movement relative to the base in the direction laterally of the wheel axis to bring about relative feeding motion between the wheel 15 and a workpiece 16 mounted on the workhead. The machine illustrated has shoes 17 and a backing plate 18 to provide for centerless grinding. The usual diamond dressing tool 19 is also mounted on the workhead and behind the base is a cabinet 21 containing gaging and cycling controls.

Figures 2 and 3 show the details of the sliding connection between the base and the workhead. A rectangular table 22 on which the workhead proper is normally mounted overlies and is generally coextensive with a rectangular plate 23 normally bolted to the base. Side aprons 24 and 25 extend downwardly from the table in close proximity to upstanding ridges 26 and 27 of the plate, while flexible seals 28 and 29 are fastened to the lower portions of the aprons and have inwardly-directed edges which engage grooves 31 and 32 formed along the sides of the plate. A rear wall 33 extends downwardly from the table 22 and extends inwardly to form a downwardly-facing horizontal surface 34 to which is fastened a hardened steel plate 35. An angle member 36 is fastened to the plate 23 and has a flexible scraper 37 fastened to an upstanding flange, the scraper extending upwardly and contacting the lower surface of the hardened steel plate 35. To the front of the plate 23 is fastened an angle 38 having an upstanding flange to which is fastened the lower edge of a flexible shield 39 formed of rubber sheet or the like, the upper edge of the sheet is fastened to a front wall 41 which extends downwardly from and is integral with the table 22. The bight of the shield passes under a roller 42 which is freely mounted for sliding movement in vertical slots 43 formed in walls 44 at the ends of the angle 38.

Intermediate of the ridges 26 and 27, the plate 23 is formed with an upstanding abutment 45 having a plane horizontal surface 46 having a very smooth finish and a guide bar 47 is fastened to this surface midway between the sides. The surface 46 is on a level considerably below the level of the upper edges of the ridges 26 and 27.

Extending downwardly of the table 22 midway between the aprons 24 and 25 is a hollow abutment 48 having a horizontal, downwardly-directed lower surface 49. Two broad plates 51 and 52 are fastened to this surface; the plates have finely-finished lower surfaces 53 and 54, respectively, which are generally coextensive with the surface 46 of the plate abutment 45. The surfaces 53 and 54 are exactly parallel with the surface 46 and are separated from it by a very small distance to form a capillary space 55 therebetween. The adjacent edges of the plates 51 and 52 engage the sides of the guide bar 47 for smooth sliding therealong.

The table 22 and its abutment 48 have a chamber 56 formed therein, the chamber having an opening 58 at the front portion onto the upper surface of the table and having a closure 57 normally covering it; a similar opening 59 is provided at the rearward portion and a closure 61 is provided therefore. Under the opening 58 resides a nut housing 62 having outwardly-directed horizontal flanges 63 and 64 which rest on horizontal shelves 65 and 66 which extend into the chamber 56 from the sides. Clamping members 67 and 68 engage the flanges and serve to maintain the nut housing in place, except for sliding movement. The housing is provided with a central bore 69 to receive a nut and screw combination, as will be described more fully hereinafter.

The front portion of the plate 23 extends well beyond the front wall 41 of the table 22 and to this extension is fastened a feed-actuating mechanism 71 consisting of a main body 72. The upper portion of the body is provided with a bore 73 aligned with the bore 69 of the nut housing 62; in the bore 73 is mounted a bearing 74 carrying a screw 75. Means is provided to assure that the screw is capable of rotation only, but not of longitudinal movement relative to the body 72. A hood 76 is fastened to the table 22 and envelopes the mechanism; this general arrangement may also be observed in Figure 1.

The screw 75 passes through an aperture 77 in the front wall 41 and engages a nut 78 which lies in the bore 69 in the nut housing 62. The nut and screw are of the well-known type in which small balls 79 lie in semi-circular grooves in the screw and similar grooves in the nut, thereby affording substantially frictionless engagement therebetween. The nut is retained in place in the bore 69 by means of a lock nut 81 and a seal 82 prevents the admission of foreign matter into the nut.

To the rearward portion of the nut housing is fastened a cylinder 83 having a bore 84 which is aligned with the bore 69 and which carries a plunger 85 which extends into the housing 62 to contact the end of the screw 75. A coil spring 86 lies within the bore 84 and contacts the plunger 85 at one end. At the other end, the spring engages a fixed rear wall 87 of the cylinder. A rod 88 extends from the outer side of the wall 87 and is provided at its rearward end with a piston 89. The piston is freely slidable in a bore 91 of a short cylinder 92 which is supported in the chamber 56 under the rear opening 59.

The table 22, the base 23, the apron 25, and the abutment 48 define a side chamber 93 in which is located a bearing apparatus 94. The bearing apparatus 94 is located at the front, right-hand side of the table 22; a similar bearing apparatus is located at the rear of the right-hand side and also at the front and rear of the left-hand side, so that the table is supported on such an apparatus at each corner. As is evident in Figure 3, an abutment 95 extends upwardly from the plate 23 midway between the ridge 27 and the abutment 45 and has a horizontal upper surface 96; a similar abutment 97 having a horizontal, downwardly-directed surface 98 is fastened to the underside of the table 22 so as to overlie the abutment 95. Referring to Figures 4 and 5, a lower block 99 is bolted to the surface 96 of the abutment 95 and is provided with a smoothly-finished, raised, horizontal contact surface 101. A pin 102 extends horizontally through the central portion of the block. A block 103 is fastened to the surface 98 of the abutment 97 and is provided with a raised horizontal contact surface 104 which is also finely finished. A horizontal pin 105 extends through the central portion of the block exactly above the pin 102. A bore 110, threaded for a conduit fitting, enters one end of the block and meets a horizontal passage 106 which, in turn, intersects vertical bores 107 at its ends; the lower ends of the vertical bores open on the surface 104 while the upper ends lead to a recess 108. Two more vertical bores 109 lead from the recess to the surface 104 of the block. Each vertical bore has a lower portion of reduced diameter and a wick, not shown, which lies over the reduced portion. The bores 110 of the four upper blocks of the machine are connected by a tube 112 to a lubricating system, not shown.

Between the surfaces 101 and 104 is located a hardened steel roller 113 having a smooth cylindrical surface and an axial journal 114 protruding from each end. Rectangular limiting plates 115 and 116 having suitable circular apertures to admit the journal ends are mounted thereon and snap rings 117 and 118 serve to lock them in place on the journal. At the upper end the plate 116 is provided with a slot 119 in which the pin 105 resides, while the lower end is provided with a similar slot 121 which cooperates with the pin 102. Slots of this same nature are provided in the plate 115. A clip 122 extends across the open end of the slot 119.

The operation of the apparatus will now be readily understood in view of the above description. With the wheel 15 and the workpiece 16 rotating in the usual manner and the wheel reciprocating axially within the bore in the workpiece, it is necessary that the workhead 13 be moved laterally to bring the wheel into abrading relation to the workpiece. For this purpose, the screw 75 is rotated by the usual means, not shown, and, because of the nature of its engagement with the nut 78, the table 22 is forced to move relative to the plate 23. This brings about the desired lateral movement of the workhead 13 relative to the base 11 and relative to the axis of the wheel 15. The weight of the table 22 and the workhead mounted thereon is entirely borne by the four rollers 113. The surfaces 101 and 104 move parallel to each other with the rollers 113 rotating between them; oil emerging slowly from the vertical bores 107 and 109 assures adequate lubrication of this action. The plates 115 and 116 serve to restrain the roller from emerging from between the surfaces. Referring particularly to Figures 2 and 3, a pool of oil is maintained in the hollow in the plate 23 formed by the ridges 26 and 27 at the sides and the angles 36 and 38 at the ends; the level is maintained slightly below the upper edges of the ridges, as is indicated by the dotted line in Figure 3. This means that the surfaces 46, 53 and 54 are always submerged and the space 55 is always filled with oil. As movement takes place, the shearing action of these relatively-moving surfaces produces a viscous damping that removes any trace of vibration from the action.

The plunger 85 is resiliently biased by the spring 86 into contact with the end of the screw 75 to remove backlash. The piston 89 can be moved from one end of the cylinder 92 to the other, by the admission of fluid under pressure from a source, not shown. This causes the table 22 to move rapidly relative to the plate 23 when necessary. This action will be brought about, for instance, to remove the workpiece from the wheel after the grinding operation is finished; the action, of course overrides that attributable to the nut and screw combination.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

The invention having been thus described, what is claimed as new and desired to secure by Letters Patent is:

1. A machine tool comprising a horizontal base plate, a horizontal table overlying the base plate, means to bring about regulated movement of the table relative to the plate in a horizontal plane, means to restrict the table movement to linear travel, anti-friction means lying between the table and the plate, and horizontal surfaces associated with both table and plate, the said surface of the table being opposed to and slightly spaced from the said surface of the plate, and means to provide for a pool of oil in which these surfaces are submerged thus providing viscous damping which is operative during the table movement.

2. A machine tool comprising a horizontal base plate, a horizontal table overlying the base plate, an anti-friction screw and nut combination to bring about regulated movement of the table relative to the plate in a horizontal plane, means to restrict the table movement to linear travel, a plurality of rollers lying between the table and the plate, means to restrict the movement of the rollers during the table movement, and horizontal surfaces associated with both table and plate the surfaces being generally parallel and closely adjacent to one another, the said surface of the table being opposed to and slightly spaced from the said surface of the plate, and means to provide for a body of oil between the said surfaces thus providing viscous damping which is operative during the table movement.

3. A machine tool comprising a horizontal base plate, a horizontal table overlying the base plate, means to bring about regulated movement of the table relative to the plate in a horizontal plane, means to restrict the table movement to linear travel, a plurality of right cylindrical rollers lying between the table and the plate, limiting plates to restrict the movement of the rollers during the table movement, there being a limiting plate fastened to each end of each roller by a journal extending axially from the roller and centrally through the limiting plates, each limiting plate having one slotted end which resides adjacent to the table and another slottted end which resides near the base plate, and pins associated with the table and plate and slidably engaging a respective slotted end.

4. A machine tool comprising a horilontal base plate, a horizontal table overlying the base plate, means to bring about regulated movement of the table relative to the plate in a horizontal plane, means restricting the table movement to linear travel, a plurality of anti-friction devices lying between the table and the plate, each such device consisting of an upper block fastened to the under side of the table, a lower block fastened to the upper side of the plate, the blocks having opposed, horizontal, finely-finished surfaces, a right circular cylindrical roller residing between the surfaces, limiting plates to restrict the movement of the rollers during the table movement, there being a limiting plate fastened to each end of each roller by means of a journal extending axially from the roller and centrally through the limiting plates, each limiting plate having one slotted end which resides adjacent the table and another slotted end which resides near the base plate, and pins associated with the table and plate and slidably engaging a respective slotted end.

5. A machine tool comprising a horizontal base plate, a horizontal table overlying the base plate, a ball-type screw and nut combination to bring about regulated movement of the table relative to the plate in a horizontal plane, means to restrict the table movement to linear travel, anti-friction means lying between the table and the plate, and horizontal surfaces associated with both table and plate, the said surface of the table being opposed to and slightly spaced from the said surface of the plate, and means to provide for a pool of oil in which these surfaces are submerged, thus providing viscous damping which is operative during the table movement.

6. A machine tool comprising a horizontal base plate, a horizontal table overlying the base plate, a ball-type screw and nut combination to bring about regulated movement of the table relative to the plate in a horizontal plane, means to restrict the table movement to linear travel, a plurality of light cylindrical rollers lying between the table and the plate, limiting plates to restrict the movement of the rollers during the table movement, there being a limiting plate fastened to each end of each roller by a journal extending axially from the roller and centrally through the limiting plates, each limiting plate having one slotted end which resides adjacent the table and another slotted end which resides near the base plate and pins associated with the table and plate and slidably engaging a respective slotted end.

7. A machine tool comprising a horizontal base plate, a horizontal table overlying the base plate, a ball-type screw and nut combination to bring about regulated movement of the table relative to the plate in a horizontal plane, means to restrict the table movement to linear travel, a plurality of anti-friction devices lying between the table and the plate, each such device consisting of an upper plate fastened to the under side of the table, a lower plate fastened to the upper side of the plate, the blocks having opposed, horizontal, finely-finished surfaces, a right circular cylindrical roller riding between the surfaces, limiting plates to restrict the movement of the rollers during the table movement, there being a limiting plate fastened to each end of each roller by means of a journal extending axially from the roller and centrally through the limiting plates, each limiting plate having one slotted end which resides adjacent the table and another slotted end which resides near the base plate, and pins associated with the table and the plate and slidably engaging a respective slotted end.

References Cited in the file of this patent
UNITED STATES PATENTS

| 2,378,343 | Walter | June 12, 1945 |
| 2,607,636 | Michelsen | Aug. 19, 1952 |
| 2,699,018 | Carman | Jan. 11, 1955 |

FOREIGN PATENTS

| 687,432 | Great Britain | Feb. 11, 1953 |